US008656508B2

(12) United States Patent
King et al.

(10) Patent No.: US 8,656,508 B2
(45) Date of Patent: Feb. 18, 2014

(54) LICENSED FEATURE ENABLEMENT MANAGER

(75) Inventors: Nigel King, San Mateo, CA (US); June S. Farmer, San Francisco, CA (US); Nigel David Smith, Redwood City, CA (US); Lee Hian Quek, Foster City, CA (US); Mandar Mangesh Borkar, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 689 days.

(21) Appl. No.: 12/509,115

(22) Filed: Jul. 24, 2009

(65) Prior Publication Data

US 2011/0023123 A1      Jan. 27, 2011

(51) Int. Cl.
  *G06F 7/04*    (2006.01)
  *G06F 21/00*   (2013.01)
  *G06F 21/10*   (2013.01)

(52) U.S. Cl.
  CPC .................................... *G06F 21/105* (2013.01)
  USPC ............................................... 726/28; 705/59

(58) Field of Classification Search
  CPC ..................................................... G06F 21/105
  USPC ............................................... 726/28; 705/59
  See application file for complete search history.

(56) References Cited

U.S. PATENT DOCUMENTS

| 8,381,306 B2 * | 2/2013 | McPherson et al. ............. 726/27 |
| 2002/0184521 A1 * | 12/2002 | Lucovsky et al. ............. 713/200 |
| 2004/0064419 A1 * | 4/2004 | Glassco et al. .................. 705/59 |
| 2005/0125509 A1 * | 6/2005 | Ramachandran ............. 709/220 |
| 2005/0171958 A9 * | 8/2005 | Cheng et al. .................... 707/100 |
| 2006/0200419 A1 * | 9/2006 | Cook et al. ....................... 705/59 |
| 2008/0021716 A1 * | 1/2008 | Buss et al. ......................... 705/1 |
| 2008/0052775 A1 * | 2/2008 | Sandhu et al. .................. 726/14 |
| 2008/0070495 A1 * | 3/2008 | Stricklen et al. ............. 455/3.01 |
| 2008/0133289 A1 * | 6/2008 | Armour et al. .................... 705/7 |
| 2008/0201493 A1 | 8/2008 | Richardson et al. |
| 2008/0263543 A1 * | 10/2008 | Ramachandran ............. 717/177 |
| 2009/0113397 A1 | 4/2009 | Wright, Sr. |
| 2009/0119779 A1 * | 5/2009 | Dean et al. ....................... 726/26 |
| 2009/0187995 A1 * | 7/2009 | Lopatic ............................ 726/31 |
| 2009/0249488 A1 * | 10/2009 | Robinson et al. ............... 726/26 |
| 2010/0306775 A1 * | 12/2010 | Appiah et al. ................ 718/100 |

* cited by examiner

*Primary Examiner* — Techane Gergiso
(74) *Attorney, Agent, or Firm* — Miles & Stockbridge P.C.

(57) ABSTRACT

Systems and methods provide for licensed feature enablement management for deploying software to be used in conformance with a software license agreement. The system includes a software application provider server that deploys a software application and a role hierarchy enumerating a list of roles and features of the software application that each role in the list of roles is licensed to use in accordance with a license agreement. The software application provider server further comprises a role examiner server that determines whether the deployed software application is being used in compliance with the software license. The system also includes a customer enterprise application server that receives the deployed application and role hierarchy and enables use of the application to customer employees based on their assigned roles. The customer enterprise application server comprises a role directory server that responds to queries from the role examiner to maintain conformance with the software license.

19 Claims, 6 Drawing Sheets

Fig. 3

LICENSED FEATURE ENABLEMENT MANAGER

FIELD OF THE INVENTION

One embodiment is directed generally to software licensing, and more particularly to role-managed software licensing.

BACKGROUND INFORMATION

Software companies design software package offerings that are distributed to a wide variety of customers. For example, a software company may provide a software package offering to customer, and may also provide the same software package offering to another internal customer, such as a different department within the same company. Although the technology package delivered to each customer may be the same in each case, the legal terms and conditions for using the software package offering may be different for different users.

In addition, a software product may be capable of supporting many different operational environments, and may also enable or disable particular features based upon the operational environment. For example, one customer may use a software product in a "development" environment while another customer may use the same software product in a "production" environment. In this example, a software product's "development" features may be disabled when the software product is used in a "production" environment.

A challenge found with using a software product in different environments, however, is that a software company is typically required to create multiple software package offerings that include the same software product, but each software package offering includes different legal terms and conditions for different customers and different environments. For example, a software product that is intended for a developer environment includes, in its software package offering, a license agreement that incorporates legal terms and conditions that are based upon the use of the software product in a development environment. These legal terms and conditions may not be applicable to a customer that uses the same software product in a production environment.

SUMMARY OF THE INVENTION

One embodiment is a system for licensed feature enablement management for deploying software to be used in conformance with a software license agreement. The system includes a software application provider server that deploys a software application role hierarchy enumerating a list of roles and features of the software application that each role in the list of roles is licensed to use in accordance with a license agreement. The software application provider server further comprises a role examiner server that determines whether the deployed software application is being used in compliance with the software license. The system also includes a customer enterprise application server that receives the deployed application and role hierarchy and enables use of the application to customer employees based on their assigned roles. The customer enterprise application server comprises a role directory server that responds to queries from the role examiner to maintain conformance with the software license.

BRIEF DESCRIPTION OF THE DRAWINGS

FIG. 3 is an example user interface in accordance with an embodiment.

DETAILED DESCRIPTION

Traditional software licenses or end user license agreements ("EULAs") are device-centric, as a user is most often permitted to install a software application onto as many machines as the particular terms of a license permits. Contrary to conventional systems, an embodiment is directed to a "role-centric" resource licensing model. A Licensed Feature Enablement System ("LFES") described herein may be employed to manage a record of persistent licenses for a software or service product, which may be accessed upon request to use a particular application. By way of example, an enterprise can employ a local service that manages the enterprise local assignment of licenses to specific roles, or role memberships. Moreover, the enterprise can communicate the aggregate license statistics to the service provider.

In accordance with a role-centric licensing model, the resource license (and subscription) rights can migrate with a role without regard to physical location, device used, or other contextual factors (e.g., activity engaged, current capacity). As described above, this persistent license can regulate access to off-premise as well as local (e.g., on-premise) resources.

In accordance with the licensor infrastructure, access to resources (e.g., applications, data, services, hardware) is enabled in accordance with an established role and corresponding rights. By way of example, when a client requests or prompts use of an application, the system can automatically establish the client's role, map the role to a valid license right, and render the application (or portion thereof) as appropriate. In still other aspects, multiple roles can be maintained within for a single user. For example, a user might have a "manager" role and a "developer" role, each having different rights, preferences and limitations.

To that end, an LFES in accordance with an embodiment is seeded with a set of roles that are recognizable as illustrative job roles as well as roles that are recognizable as duties of people that perform those jobs. These roles are arranged in a hierarchy that is implemented as a hierarchy of role memberships. The LFES may contain a matrix of deployed feature combinations. The list of licensable features of the application either alone, or in combination with the licensing of any other licensable feature, may influence the role hierarchy memberships that should be allowed. For any combination of licensed products, the user may select a role membership to enable.

The LFES may contain a set of application program interfaces ("APIs") that will verify that a nominated customer license management server is in conformance with the role hierarchy memberships that should be in place given the features that have been licensed, and report the conformance status for each licensed feature.

Figure 1:
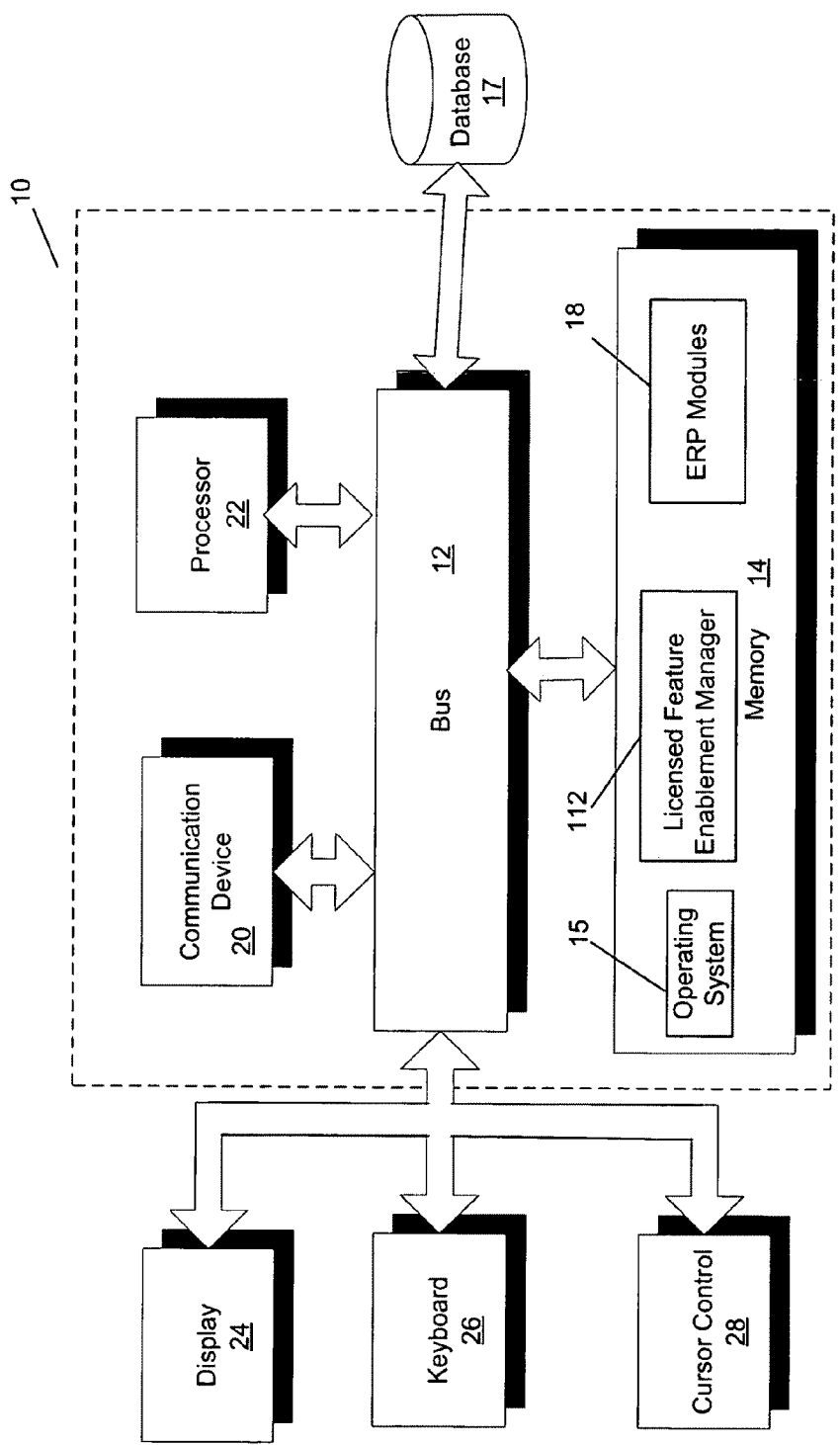
FIG. 1 is a block diagram of a system that can implement a licensed feature enablement manager in accordance with an embodiment.

FIG. 1 is a block diagram of a system 10 that can implement an LFES in accordance with an embodiment. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a Licensed Feature Enablement Management ("LFEM") module 112. This module is disclosed in greater detail below. The modules may further include enterprise resource planning ("ERP") modules 18 of an ERP system that may interact with LFEM module 112, such as human resource ("HR") modules and human capital management ("HCM") modules. An ERP system is a computer system that integrates several data sources and processes of an organization into a unified system. A typical ERP system will use multiple modules of computer software and hardware to achieve the integration. A unified ERP database 17, coupled to bus 12, is used to store data for the various system modules. In one embodiment, the ERP modules are from the "E-Business Suite" from Oracle Corp. In some embodiments, LFEM module 112 may be a stand-alone system and not integrated with an ERP system, or may be part of any other integrated system.

Figure 2:
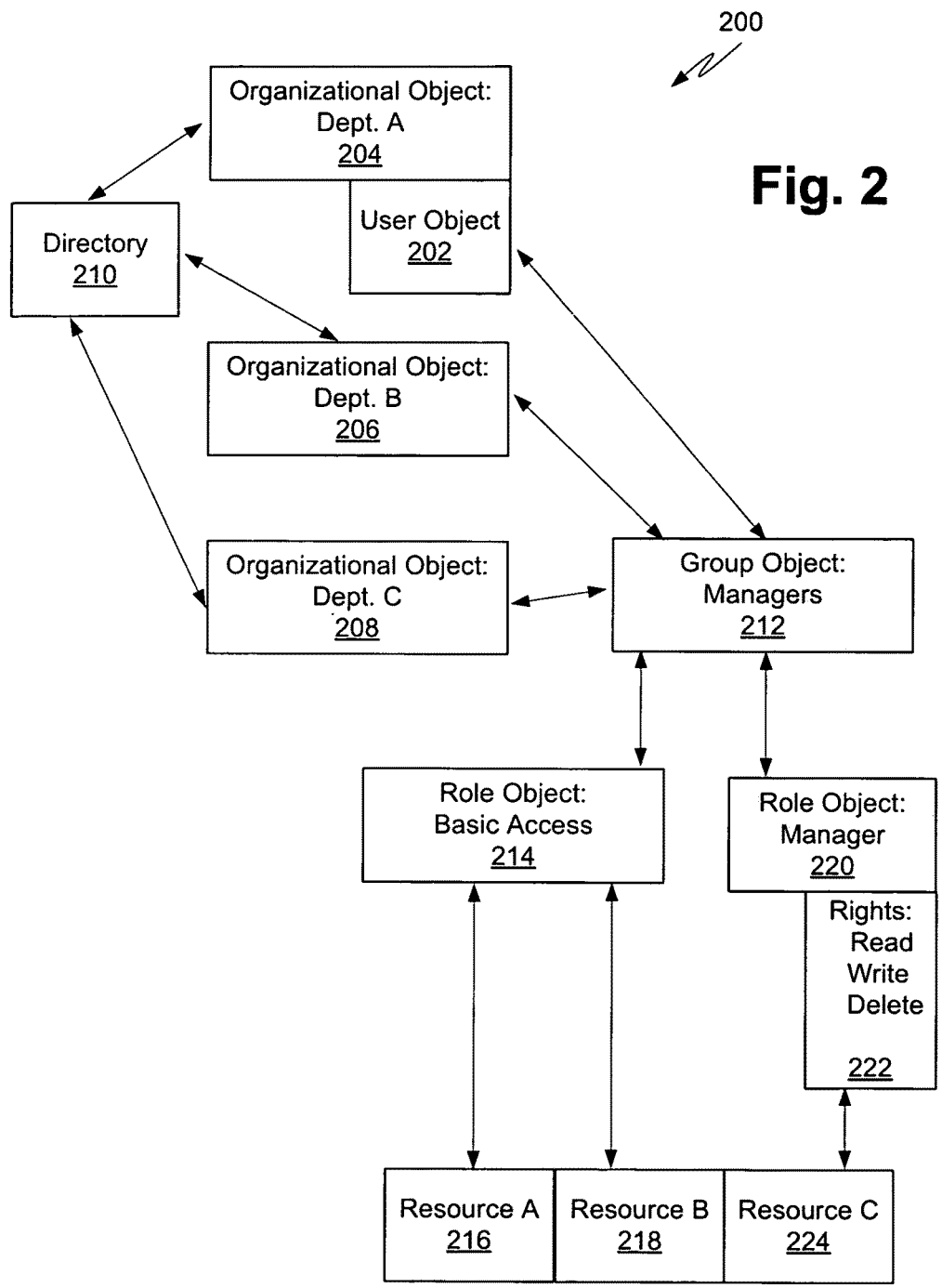
FIG. 2 is an example role-based system in accordance with an embodiment.

With reference now to FIG. 2, a block diagram depicts a typical role-based access control system. The elements shown within security management system merely represent some of the general concepts, objects, relationships, or associations within a role-based access control system. Depending on the implementation of security management system 200, the objects and relationships may have different names and functions.

Within an enterprise, an employee may "belong" to one or more organizational units, such as a department and a project. User object 202, which represents an employee, is associated with organizational object 204. Organizational objects 204, 206, 208 represent multiple organizational units within an enterprise, and each organizational unit is assumed to have multiple employees or users, and information about those employees are stored within corporate directory 210, which may be implemented as a data directory supported by one or more directory services.

User object 202 represents not only an employee but also a manager, so user object 202 is associated with group object 212, which represents a group of similar managers. In FIG. 2, organizational unit objects 206 and 208 are shown as being associated with group object 212. It may be assumed that each organizational unit within the enterprise has a manager of the type represented by group object 212, although the specific employees within the organizations represented by objects 206 and 208 are not specifically identified in the diagram.

Depending on an employee's title or job description within the enterprise, an employee may be assigned one or more roles within the security management/administration system. Group object 212 is associated with role object 214, which defines a role having basic access rights to resources 216 and 218. For example, each employee of the enterprise may have access to certain types of basic computational resources, such as an intranet account for accessing an internal, enterprise-wide, Web site. This basic access is also applicable to each manager associated with group object 212, so group object 212 has been associated with role object 214; resource 216 might represent authorization to access a particular internal Web server, while resource 218 might represent authorization to access a firewall to the Internet.

However, each manager within the organization might require special privileges for accessing, for example, an invoice management application. In order to reflect actual business processes, role object 220 is defined and associated with group object 212, and role object 220 has a set of access rights 222 that determine exactly how any user associated with role object 220 is enabled to use resource 224, which might represent the invoice management application. The invoice management application may be used by different types of employees within the enterprise who have different authorized uses of the invoice management application. For example, a clerical employee may be allowed to view a purchase order in the invoice management application, but not be able to approve it, whereas a manager role would have permission to approve the purchase order.

Figure 3:
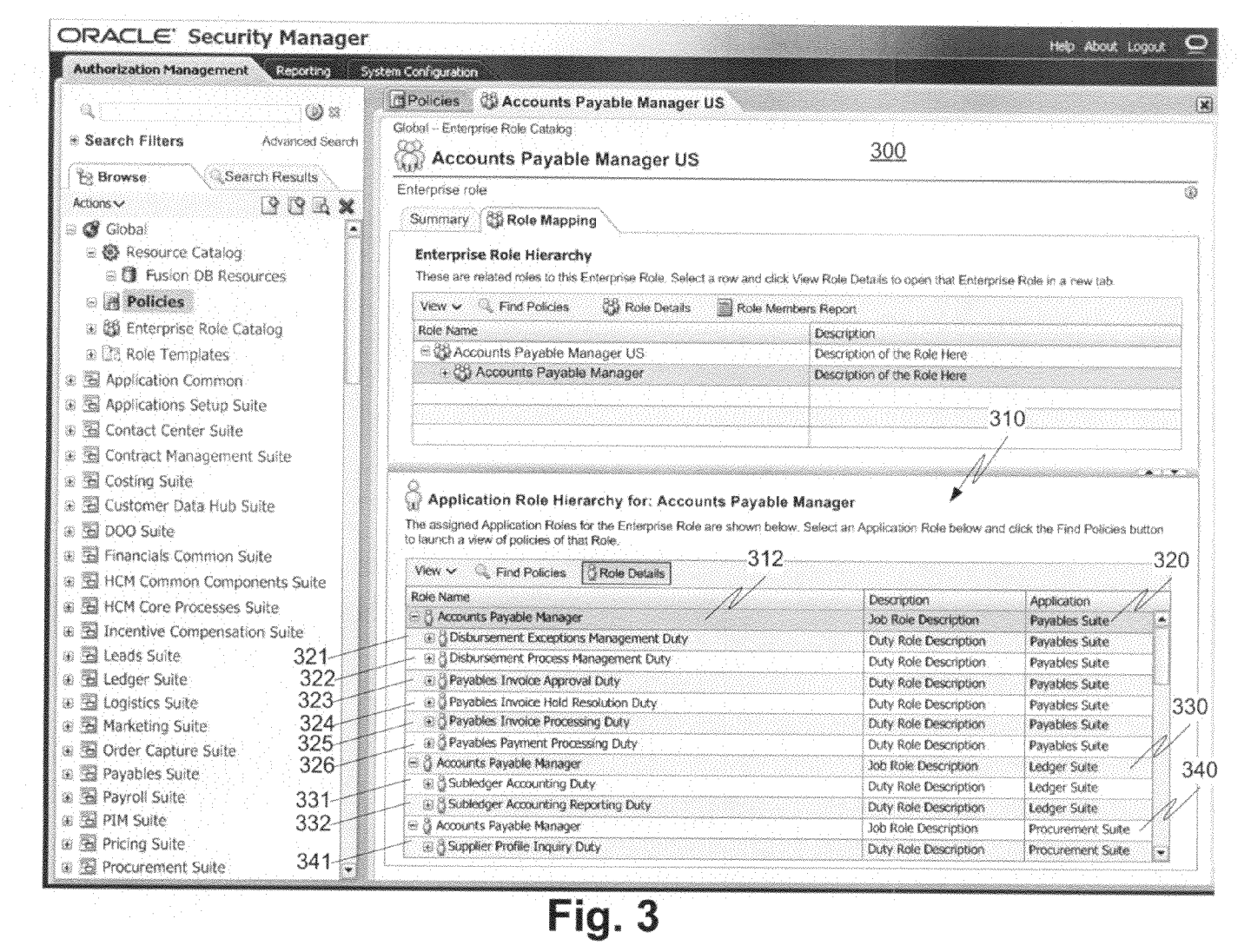

As shown with respect to the description of FIG. 2 above, different roles can have different access rights across different kinds of resources. The features accessible by each role are determined from the corresponding EULA for that application, and LFEM module 112 maintains a mapping of features to roles based on the EULAs for licensed applications. For example, an Accounts Payable role may be enabled to perform a number of functions within a Payables application, a Ledger application, and a Procurement application, but may not be enabled to access every feature of those applications because the customer organization does not possess a site-wide license for those applications. FIG. 3 illustrates an example user interface 300 for LFEM module 112 illustrating an application role hierarchy for the role "Accounts Payable Manager". Role hierarchy 310 shows that Accounts Payable Manager role 312 includes a plurality of features licensed under the "Payables Suite" application 320, including "Disbursements Management Exceptions Duty" 321, "Disbursement Process Management Duty" 322, "Payables Invoice Approval Duty" 323, "Payables Invoice Hold Resolution Duty" 324, "Payables Invoice Processing Duty" 325, and "Payables Payment Processing Duty" 326. Role hierarchy 310 further shows that Accounts Payable Manager role 312 includes a plurality of features licensed under the "Ledger Suite" application 330, including "Subledger Accounting Duty" 331 and "Subledger Accounting Reporting Duty" 332. Role hierarchy 310 further shows that Accounts Payable Manager role 312 includes features licensed under the "Procurement Suite" application 340, including "Supplier Profile Inquiry Duty" 341.

Figure 4:
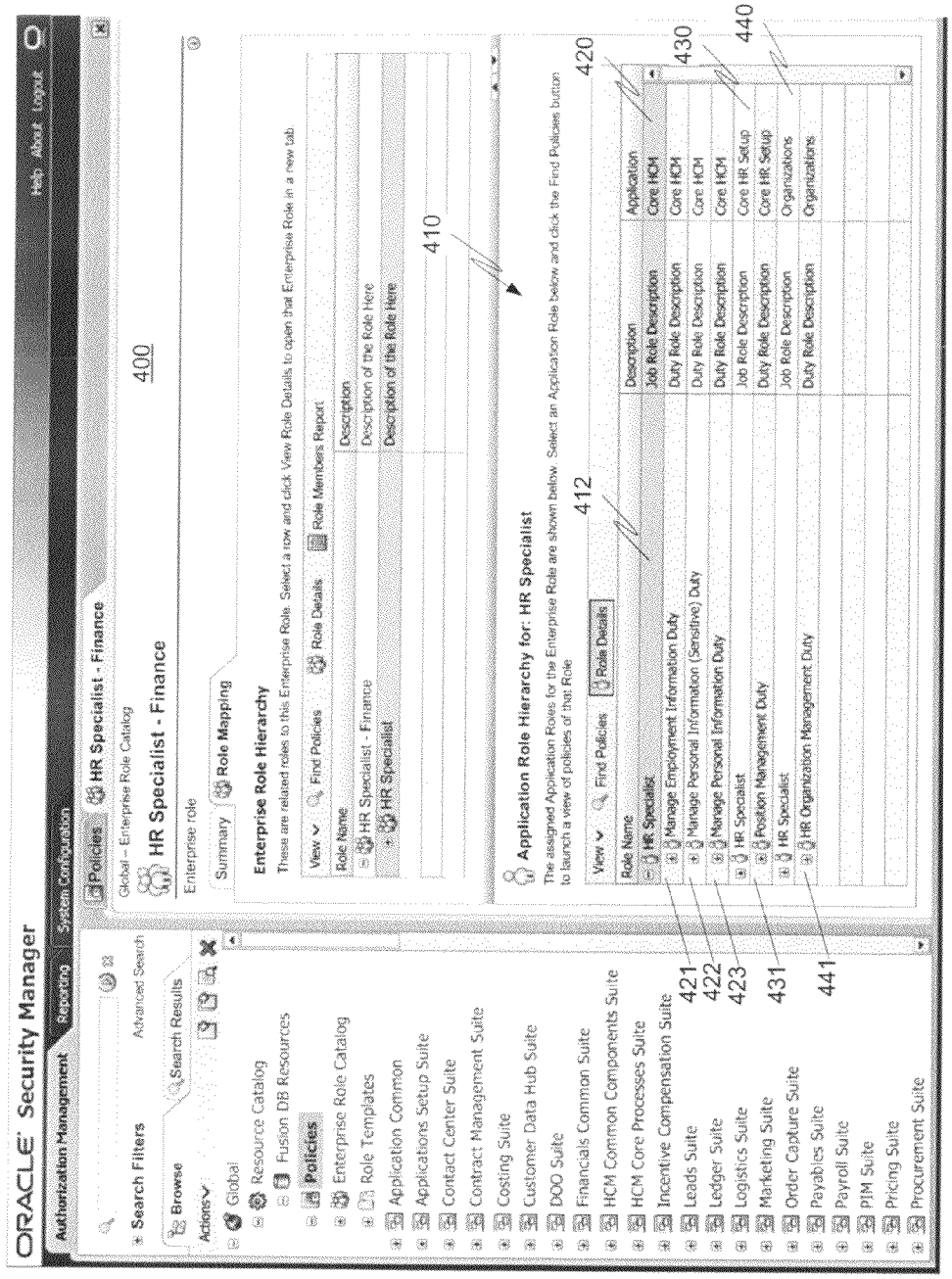
FIG. 4 is an example user interface in accordance with an embodiment.

Likewise, an HR Specialist may be enabled to perform a number of functions within a Core HCM application, a Core HR Setup application, and an Organizations application, but may not be enabled to access every feature of those applications. FIG. 4 illustrates an example user interface 400 for LFEM module 112 illustrating an application role hierarchy for the role "HR Specialist" 412. Role hierarchy 410 shows that HR Specialist 412 includes a plurality of features licensed under the "Core HCM" application 420, including "Manage Employment Information Duty" 421, "Manage Personal Information (Sensitive) Duty" 422, and "Manage Personal Information Duty" 423. Role hierarchy 410 furthers shows that HR Specialist 412 includes features licensed under "Core HR Setup" 430, including "Position Management Duty" 431. Role hierarchy 410 further shows that HR Specialist 412 includes features licensed under "Organizations" application 440, including "HR Organization Management Duty" 441.

Figure 5:
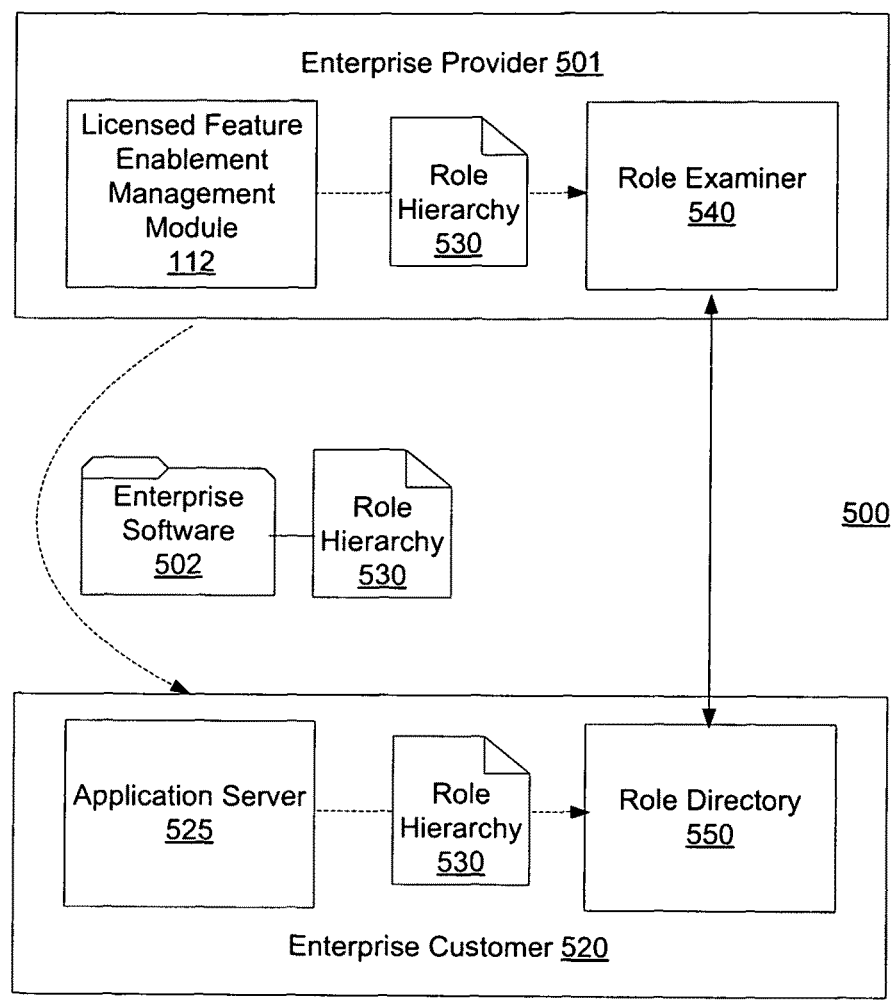
FIG. 5 is a block diagram of the licensed feature enablement system in accordance with an embodiment.

FIG. 5 illustrates an enterprise system 500 in accordance with an embodiment. Enterprise provider 501, which in one embodiment is implemented by in memory 14 of FIG. 1, includes LFEM module 112 as well as enterprise software 502 that is deployed to an application server 525 of enterprise customer 520. Enterprise software 502 is deployed with an application role hierarchy 530 that determines which employee roles at enterprise customer 520 may access which features of enterprise software 502. In an embodiment, role hierarchy 530 is implemented from a matrix of licensed features determined by a deployment administrator of enterprise provider 501 based on a EULA for enterprise software 502.

Enterprise software 502 may include a plurality of subparts (not shown), such as an applications setup suite, a contact center suite, a contract management suite, a costing suite, a financials suite, an HCM suite, a compensation suite, a ledger suite, a marketing suite, a payable suite, a payroll suite, a pricing suite, a procurement suite, etc. Role hierarchy 530 defines the members of which roles may access particular features of the various subparts in accordance with the EULA. Enterprise provider 501 further includes a role examiner 540 for accessing a corresponding role directory 550 in enterprise customer 520. Each of role examiner 540 and role directory 550 maintain a copy of role hierarchy 530 that is valid under the EULA. Role examiner 540 may query role directory 550 to ensure that both copies of role hierarchy 530 match. Both role examiner 540 and role directory 550 may be a Lightweight Directory Access Protocol ("LDAP") server, which can be a tree-based directory server that communicates via Transmission Control Protocol/Internet Protocol ("TCP/IP").

An example matrix of licensed features is shown below. The matrix includes, for each licensed product/application (e.g., Human Resources, "iProcurement"), a corresponding role, and the licensed feature (e.g., Compensation Management) for that role. As shown in the below example matrix, a Line Manager can access the Compensation Management and Career Planning features of HR, while an Employee can access the Requisitioning features of iProcurement.

| Licensed Product | Role | Inherited Role |
| --- | --- | --- |
| Human Resources | Line Manager | Compensation Management |
| Human Resources | Line Manager | Career Planning |
| iProcurement | Employee | Requisitioning |

Figure 6:
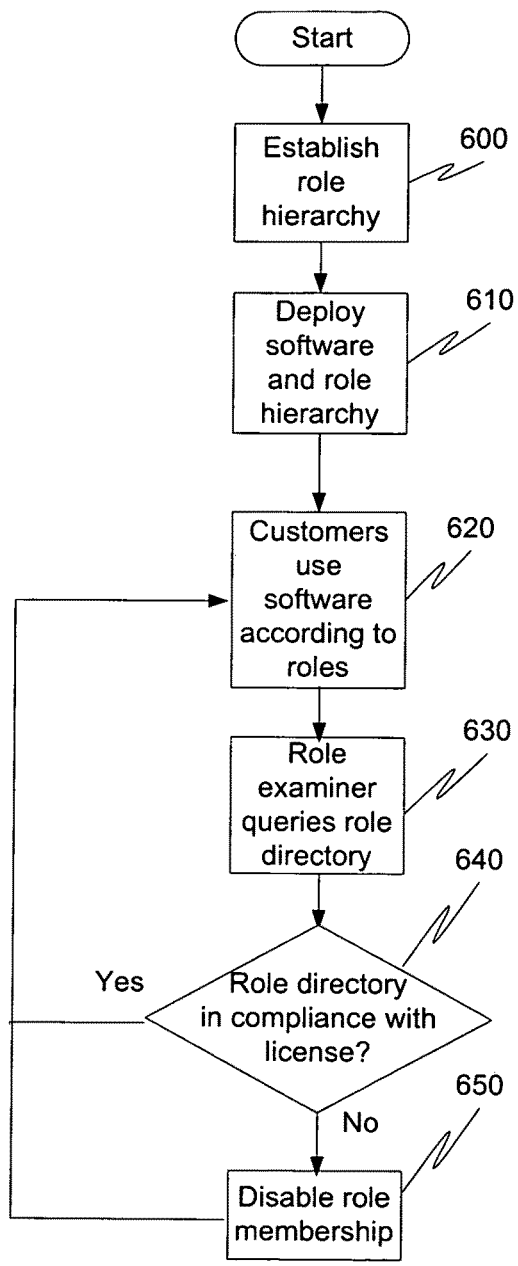
FIG. 6 is a flow diagram depicting a method for managing licensed features of a software application in accordance with an embodiment.

FIG. 6 illustrates a flow diagram of the functionality of enterprise provider 501 of FIG. 5 when deploying software to a customer in accordance with an embodiment. In one embodiment, the functionality of the flow diagram of FIG. 6 is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

A deployment administrator uses LFEM module 112 to establish role hierarchy 530 based on an EULA agreed upon by enterprise provider 501 and enterprise customer 520 (600). Enterprise software 502 and role hierarchy 530 are then deployed to enterprise customer 520, and role hierarchy 530 is stored in both role examiner 540 and role directory 550 (610). Employees within enterprise customer 520 may then use enterprise software 502 in accordance with their roles and role hierarchy 530 (620). For a specific role, all members of that role may use the software. Role examiner 540 then randomly or periodically queries role directory 550 to determine that enterprise customer 520 is in compliance with the EULA (630). Role examiner 540 may do this using APIs provided with enterprise software 502 at deployment. Example pseudocode that can identify compliance issues between role examiner 540 and role directory 550 is presented below:

```
-- Initially, assign role with product IDs
WHEN A NEW PRODUCT IS MARKED LICENSED in the LICENSED
PRODUCT HIERARCHY
      Check in LDAP server if any role exists with the product id
of newly inducted product.
      SELECT 'x'
      FROM LDAP_GROUP_MEMBERSHIP_ROLES
      WHERE product_id = :new_product_id;
      IF no role found THEN
            RAISE COMPLIANCE_ISSUE;
      END IF;
-- Remove product id stamp from role.
WHEN AN EXISTING LICENSED PRODUCT IS MARKED
UNLICENSED in the LICENSED PRODUCT HIERARCHY
      Check in LDAP server if any role exists with the product id
of newly inducted product.
      SELECT 'x'
      FROM LDAP_GROUP_MEMBERSHIP_ROLES
      WHERE product_id = :removed_product_id;
      IF role found THEN
            RAISE COMPLIANCE_ISSUE;
      END IF;
```

If role directory 550 is determined not to be in compliance (640), the non-compliant role membership is disabled by role examiner 540 (650). If role directory 550 is determined to be in compliance (640), the enterprise customers continue to use the software in accordance with the license and role examiner 540 periodically queries role directory 550 (620, 630). Further, a role administrator may edit employee roles within enterprise customer 520 when a new feature is licensed. This will not raise a compliance issue because role hierarchy 530 is automatically updated in accordance with the amended license.

Accordingly, a system for licensed feature enablement management for deploying software to be used in conformance with a software license agreement is disclosed. The system includes a software application provider server that deploys a software application and a role hierarchy enumerating a list of roles and features of the software application that each role in the list of roles is licensed to use in accordance with a license agreement. The system also includes a customer enterprise application server that receives the deployed application and role hierarchy and enables use of the application to customer employees based on their assigned roles.

In contrast, with prior systems customers were relied upon to change role hierarchies when they licensed additional functionality in a software application. Also, customers may have not known that changes that are made to the role hierarchy brought them out of license compliance and subject to additional software licensing costs. Communication between the role examiner and role directory in an embodiment of the present invention at the customer site ensures that compliance with the software license will be maintained.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A non-transitory computer-readable medium having instructions stored thereon that, when executed by a processor, cause the processor to manage the use of an enterprise software application having a plurality of licensable features, the managing comprising:
   receiving, by an enterprise customer, the enterprise software application and a copy of a role hierarchy from an enterprise software application provider, the role hierarchy and the copy of the role hierarchy enumerating a list of roles and licensable features of the enterprise software application that each role in the list of roles is licensed to use in accordance with a license, the enterprise software application provider including a role-centric licensed feature enablement management (LFEM) module and a role examiner, the enterprise customer including an application server and a role directory;
   assigning at least one role to each user;
   enabling selective use of the features of the enterprise software application by the users in accordance with the copy of the role hierarchy and the roles assigned to the users;
   providing the copy of the role hierarchy to the enterprise customer role directory;
   receiving, by the enterprise customer role directory, a query for the copy of the role hierarchy from the role examiner of the enterprise software application provider;
   sending the copy of the role hierarchy to the role examiner of the enterprise software application provider; and
   receiving, from the role examiner of the enterprise software application provider, instructions to disable at least one non-compliant role in the copy of the role hierarchy.

2. The computer-readable medium of claim 1, wherein the role hierarchy includes job description roles and duty roles.

3. The computer-readable medium of claim 1, wherein the software application is an enterprise software application suite.

4. The computer-readable medium of claim 3, wherein at least some of the roles correspond to specific components of the software application suite.

5. The computer-readable medium of claim 3, wherein the license includes a site-wide license for at least some components of the suite, and a role-specific license for other components of the suite.

6. The computer-readable medium of claim 1, wherein the role in the role hierarchy is determined to not be in compliance when a feature enumerated by the role hierarchy is marked as licensed without being associated with any corresponding role.

7. A computer-implemented method for managing the use of an enterprise software application having a plurality of licensable features, the method comprising:
   generating, by an enterprise software application provider, a role hierarchy enumerating a list of roles and licensable features of the enterprise software application that each role in the list of roles is licensed to use in accordance with a license agreement, the enterprise software application provider including a role-centric licensed feature enablement management (LFEM) module and a role examiner;
   deploying a copy of the role hierarchy with the enterprise software application to an enterprise customer having an application server and a role directory;
   querying the enterprise customer role directory for the copy of the role hierarchy;
   determining whether the copy of the role hierarchy received from the enterprise customer role directory is in compliance with the software license; and
   sending instructions to the enterprise customer to disable at least one non-compliant role in the copy of the role hierarchy.

8. The method of claim 7, wherein the role hierarchy includes job description roles and duty roles.

9. The method of claim 7, wherein the software application is an enterprise software application suite.

10. The method of claim 9, wherein at least some of the roles correspond to specific components of the enterprise software application suite.

11. The method of claim 9, wherein the software license includes a site-wide license for at least some components of the suite, and a role-specific license for other components of the suite.

12. The method of claim 7, wherein the role in the role hierarchy is determined to not be in compliance when a feature enumerated by the role hierarchy is marked as licensed without being associated with any corresponding role.

13. A system for the use of an enterprise software application having a plurality of licensable features, the system comprising:
   a processor; and
   a memory device, coupled to the processor, storing:
      a role-centric license feature enablement management (LFEM) module for generating a role hierarchy enumerating a list of roles and licensable features of the enterprise software application that each role in the list of roles is licensed to use in accordance with a license agreement, and for deploying a copy of the role hierarchy with the enterprise software application to an enterprise customer; and
      a role examiner for querying an enterprise customer role directory for the copy of the role hierarchy, for determining whether the copy of the role hierarchy retrieved from the enterprise customer role directory is in compliance with the software license; and for sending instructions to the enterprise customer to disable at least one a non-compliant role in the copy of the role hierarchy.

14. A non-transitory computer-readable medium having instructions stored thereon that, when executed by a processor, cause the processor to manage the use of a software application having a plurality of licensable features, the managing comprising:

generating, by an enterprise provider role-centric license feature enablement management (LFEM) module, a role hierarchy enumerating a list of roles and licensable features of the enterprise software application that each role in the list of roles is licensed to use in accordance with a license agreement;

deploying, by the enterprise provider LFEM module, a copy of the role hierarchy with the software application to an enterprise customer;

querying, by an enterprise provider role examiner, an enterprise customer role directory for the copy of the role hierarchy;

determining, by the enterprise provider role examiner, whether the copy of the role hierarchy retrieved from the enterprise customer role directory is in compliance with the software license; and sending, by the enterprise provider role examiner, instructions to the enterprise customer to disable at least one non-compliant role in the copy of the role hierarchy.

15. The computer-readable medium of claim 14, wherein the role hierarchy includes job description roles and duty roles.

16. The computer-readable medium of claim 14, wherein the software application is an enterprise software application suite.

17. The computer-readable medium of claim 16, wherein at least some of the roles correspond to specific components of the enterprise software application suite.

18. The computer-readable medium of claim 16, wherein the software license includes a site-wide license for at least some components of the suite, and a role-specific license for other components of the suite.

19. The computer-readable medium of claim 14, wherein the role in the role hierarchy is determined to not be in compliance when a feature enumerated by the role hierarchy is marked as licensed without being associated with any corresponding role.

* * * * *